US007779430B2

(12) United States Patent
Beisiegel et al.

(10) Patent No.: US 7,779,430 B2
(45) Date of Patent: Aug. 17, 2010

(54) METHOD, SYSTEM, AND ARTICLE OF MANUFACTURE FOR PROVIDING SERVICE COMPONENTS

(75) Inventors: Michael Beisiegel, Poughkeepsie, NY (US); Jean-Sebastien Michel Delfino, San Carlos, CA (US); Jason Robert McGee, Apex, NC (US); Martin Paul Nally, Laguna Beach, CA (US); Peter David Niblett, Whitchurch (GB)

(73) Assignee: International Business Machines Corporation, Armonk, NY (US)

( * ) Notice: Subject to any disclaimer, the term of this patent is extended or adjusted under 35 U.S.C. 154(b) by 1351 days.

(21) Appl. No.: 11/014,536

(22) Filed: Dec. 15, 2004

(65) Prior Publication Data

US 2006/0150204 A1     Jul. 6, 2006

(51) Int. Cl.
*G06F 3/00* (2006.01)
*G06F 9/44* (2006.01)
*G06F 9/46* (2006.01)
*G06F 13/00* (2006.01)

(52) U.S. Cl. ................................ 719/330
(58) Field of Classification Search ............... 719/313, 719/316, 330
See application file for complete search history.

(56) References Cited

U.S. PATENT DOCUMENTS

| | | | |
|---|---|---|---|
| 5,339,430 A | | 8/1994 | Lundin et al. |
| 5,956,509 A | * | 9/1999 | Kevner ........................ 719/330 |
| 5,960,421 A | | 9/1999 | Cline et al. |
| 6,081,812 A | | 6/2000 | Boggs et al. |
| H1921 H | * | 11/2000 | Fletcher et al. ............. 455/433 |
| 6,195,685 B1 | | 2/2001 | Mukherjee et al. |
| 6,212,575 B1 | | 4/2001 | Cleron et al. |
| 6,223,217 B1 | * | 4/2001 | Pettus ........................ 709/219 |
| 6,256,771 B1 | | 7/2001 | O'Neil et al. |
| 6,289,390 B1 | * | 9/2001 | Kavner ........................ 719/310 |
| 6,330,710 B1 | | 12/2001 | O'Neil et al. |
| 6,425,121 B1 | | 7/2002 | Phillips |

(Continued)

FOREIGN PATENT DOCUMENTS

EP       1130510         9/2001

(Continued)

OTHER PUBLICATIONS

Sun Microsystems, "Java Platform 1.2 API Specification: Interface RemoteRef", 1993-1998, Sun Microsystems, pp. 1-6.*

(Continued)

*Primary Examiner*—Hyung S Sough
*Assistant Examiner*—KimbleAnn Verdi
(74) *Attorney, Agent, or Firm*—Rabindranath Dutta; Konrad Raynes & Victor LLP

(57) ABSTRACT

Provided are a method, system, and article of manufacture, wherein a client component including at least one client interface is provided. Also provided is a target component including at least one service interface, wherein the at least one client interface is capable of matching the at least one service interface. A service interface implementation corresponding to the at least one service interface is provided, wherein the service interface implementation is a dynamic service interface implementation. The dynamic service interface implementation is executed to allow access to the client component to a service provided by the target component.

30 Claims, 9 Drawing Sheets

U.S. PATENT DOCUMENTS

| | | | | |
|---|---|---|---|---|
| 6,430,607 | B1 * | 8/2002 | Kavner | 709/217 |
| 6,438,744 | B2 | 8/2002 | Toutonghi et al. | |
| 6,446,064 | B1 | 9/2002 | Livowsky | |
| 6,448,981 | B1 | 9/2002 | Kaczmarski | |
| 6,493,868 | B1 | 12/2002 | DaSilva et al. | |
| 6,609,158 | B1 | 8/2003 | Nevarez et al. | |
| 6,643,652 | B2 | 11/2003 | Helgeson et al. | |
| 6,684,385 | B1 | 1/2004 | Bailey et al. | |
| 6,691,301 | B2 | 2/2004 | Bowen | |
| 6,691,302 | B1 | 2/2004 | Skrzynski et al. | |
| 6,697,836 | B1 * | 2/2004 | Kawano et al. | 709/202 |
| 6,697,879 | B1 | 2/2004 | Tufty et al. | |
| 6,701,513 | B1 | 3/2004 | Bailey | |
| 6,795,739 | B2 | 9/2004 | Graf et al. | |
| 6,804,818 | B1 | 10/2004 | Codella et al. | |
| 6,873,695 | B2 | 3/2005 | Celi, Jr. et al. | |
| 6,920,494 | B2 | 7/2005 | Heitman et al. | |
| 6,934,931 | B2 | 8/2005 | Plumer et al. | |
| 7,007,063 | B2 | 2/2006 | Creamer et al. | |
| 7,072,957 | B2 | 7/2006 | Creamer et al. | |
| 7,159,224 | B2 * | 1/2007 | Sharma et al. | 719/310 |
| 7,171,673 | B1 | 1/2007 | Steinman et al. | |
| 7,240,324 | B2 | 7/2007 | Casati et al. | |
| 7,246,358 | B2 * | 7/2007 | Chinnici et al. | 719/315 |
| 7,272,820 | B2 | 9/2007 | Klianev | |
| 7,281,252 | B1 * | 10/2007 | Lindquist et al. | 719/332 |
| 7,290,248 | B2 * | 10/2007 | Sengodan | 717/136 |
| 7,340,721 | B1 | 3/2008 | Bailey | |
| 7,350,184 | B2 | 3/2008 | Upton | |
| 7,356,803 | B2 | 4/2008 | Bau, III et al. | |
| 2002/0019843 | A1 * | 2/2002 | Killian et al. | 709/102 |
| 2002/0026471 | A1 | 2/2002 | Bent et al. | |
| 2002/0104067 | A1 | 8/2002 | Green et al. | |
| 2002/0152210 | A1 | 10/2002 | Johnson et al. | |
| 2003/0093551 | A1 * | 5/2003 | Taylor et al. | 709/237 |
| 2003/0182457 | A1 * | 9/2003 | Brewin | 709/310 |
| 2003/0191803 | A1 * | 10/2003 | Chinnici et al. | 709/203 |
| 2003/0204645 | A1 * | 10/2003 | Sharma et al. | 709/328 |
| 2004/0012626 | A1 | 1/2004 | Brookins | |
| 2004/0015859 | A1 | 1/2004 | Potter et al. | |
| 2004/0045009 | A1 | 3/2004 | Bryant | |
| 2004/0045013 | A1 | 3/2004 | Lam | |
| 2004/0064503 | A1 * | 4/2004 | Karakashian et al. | 709/203 |
| 2004/0148569 | A1 | 7/2004 | Sengodan | |
| 2004/0148570 | A1 | 7/2004 | Sengodan | |
| 2004/0168153 | A1 | 8/2004 | Marvin | |
| 2004/0172618 | A1 | 9/2004 | Marvin | |
| 2004/0172638 | A1 | 9/2004 | Larus et al. | |
| 2004/0177335 | A1 | 9/2004 | Beisiegel et al. | |
| 2005/0154785 | A1 | 7/2005 | Reed et al. | |
| 2005/0251527 | A1 * | 11/2005 | Phillips et al. | 707/101 |
| 2006/0129560 | A1 | 6/2006 | Adams et al. | |

FOREIGN PATENT DOCUMENTS

| | | |
|---|---|---|
| WO | WO-03/069464 | 8/2003 |

OTHER PUBLICATIONS

Heiss, J. J., "JAX-RPC Brings Portability to Web Services", [online], [Retrieved on Nov. 23, 2004]. Retrieved from the internet at <URL: http://java.sun.com/features/2003/01/jax_rpc.html>.

Horrell, S., "Introducing JAX-RPC: Build and Access Web Services based on Synchronous RPC-oriented SOAP messaging", [online], © 2001-2004 Fawcette Technical Publications, [Retrieved on Nov. 23, 2004]. Retrieved from the Internet at <URL: http://www.fawcette.com/javapro/2002%5F05/magazine/features/shorrell/default_pf.aspx>.

Prohorenko, O., "Local and Remote EJB Interfaces", [online], Nov. 3, 2004, [Retrieved on Dec. 2, 2004]. Retrieved from the Internet at <URL: http://www.onjava.com/lpt/a/5389>.

Sharma, R., "Java API for XML-based RPC (JAX-RPC): A Primer", [online], © 1994-2004 Sun Microsystems, [Retrieved on Nov. 23, 2004]. Retrieved from the Internet at <UR:: http://java.sun.com/xml/jaxrpc/primerarticle.html>.

Sun Microsystems, Inc., "J2EE Connector Architecture", *White Paper*, [online], [Retrieved on Nov. 23, 2004]. Retrieved from the Internet at <URL: http://java.sun.com/j2ee/white/connector.html>.

Merrall, S. and A. Billig, "Dynamo: Dynamic Document Generation in Java", *Proceedings of the First International Conference on the Practical Application of Java*, 1999, pp. 73-89.

Alur, D., J. Crupi, and D. Malks, "J2EE Platform Overview", [Internet], Oct. 5, 2001, [Retrieved on Dec. 11, 2004], Retrieved from the Internet at <URL: http://www.informit.com/articles/printerfriendly.asp?p=23573>.

Armstrong, E., J. Ball, S. Bodoff, D.B. Carson, I. Evans, D. Green, K. Haase, and E. Jendrock, "The J2EE 1.4 Tutorial", © 2004 Sun Microsystems, In.c., Aug. 30, 2004, Ch. 1-2, pp. 1-82.

Piccinelli, G., W. Emmerich, and A. Finkelstein, "Mapping Service Components to EJB Business Objects", *Proceedings of the Fifth IEEE International Enterprise Distributed Object Computing Conference*, 2001, pp. 169-173.

US Patent Application, entitled "Matching Client Interfaces with Service Interfaces", filed on Dec. 7, 2004, invented by Beisiegel, M., S.A. Brodsky, J.M. Delfino, Z. Feng, and A.K.D. Phan.

US Patent Application, entitled "An Architecture for Enabling Business Components to Access Middleware Application Programming Interfaces (APIs) in a Runtime Environment", filed on Dec. 15, 2004, invented by Adams, G.D., M. Beisiegel, S.A. Brodsky, J.M. Delfino, D.F. Ferguson, R.H. High, J. McGee, M.P. Nally, and P.D. Niblett.

US Patent Application, entitled "Generating Asynchronous Interfaces and Methods from Synchronous Interfaces and Methods", filed on Dec. 15, 2004, invented by Beisiegel, M., J.M. Delfino, M.P. Nally, P.D. Niblett, and D.J. Vines.

Brunvand, E., S. Nowick, and K. Yun, "Practical Advances in Asynchronous Design and in Asynchronous/Synchronous Interfaces", © 1999 ACM DAC, 6 pp.

Brush, A.J.B., M. Ames, and J. Davis, "A Comparison of Synchronous Remote and Local Usability Studies for an Expert Interface", ACM CHI, 2004, pp. 1179-1182.

D'Silva, V. and S. Ramesh, "Synchronous Protocol Automata: A Framework for Modelling and Verification of SoC Communication Architectures", Proceedings of the Design, Automation and Test in Europe Conference and Exhibition, © 2004 IEEE, 6 pp.

Gutberlet, P. and W. Rosenstiel, "Specification of Interface Components for Synchronous Data Paths", Proceedings of the 7th International Symposium on High-level Synthesis, © 1994 IEEE, pp. 134-139.

Hutanu, A., G. Allen, S. Hirmer, and A. Merzky, "Analysis of Remote Execution Models for Grid Middleware", Proceedings of the 4th International Workshop on Middleware for Grid Computing, © 2006 ACM MGC, 6 pp.

Lublinerman, R. and S. Tripakis, "Modularity Vs. Reusability: Code Generation from Synchronous Block Diagrams", Proceedings of the Conference on Design, Automation and Test in Europe, 2008 ACM EDAA, pp. 1504-1509.

Vellis, G., "Model-Based Development of Synchronous Collaborative User Interfaces", Proceedings of the 1st ACM SIGCHI Symposium on Engineering Interactive Computing Systems, © 2009 ACM EICS, pp. 309-312.

* cited by examiner

```
public interface  ServiceImplSync {    ⌐602 public Object[] invoke( String method,

Object[] args) throws
ServiceBusinessException;
}
```

```
                        ⌐702
public interface  ServiceImplAsync { public void invokeAsync(  String method,

Object[] args,

ServiceCallback callback,

Ticket ticket);
}
```

FIG. 8

```
public class CurrencyImpl implements ServiceImplSync { public Object[] invoke(String methodName, Object[] arguments) throws

ServiceBusinessException { if ("getExchangeRate".equals(methodName)) {

DataObject currency = (DataObject)arguments[0];

String country=currency.getString("name");

DataFactory exchangeRate =
              new DataFactoryImpl().create("http://currency.sample",
"getExchangeRateResponse");
          if ("CAD".equals(currency))
              exchangeRate.setFloat("value",1.50f);
          else
              exchangeRate.setFloat("value",1.0f);

return new Object[] {exchangeRate};

} else {
          throw new IllegalArgumentException("Something's wrong here");
      }
    }
}
```

METHOD, SYSTEM, AND ARTICLE OF MANUFACTURE FOR PROVIDING SERVICE COMPONENTS

RELATED APPLICATIONS

This patent application is related to the co-pending and commonly assigned patent applications, and which applications are incorporated herein by reference in their entirety:

"MATCHING CLIENT INTERFACES WITH SERVICE INTERFACES" to Michael Beisiegel, Stephen Andrew Brodsky, Jean Sebastien Michel Delfino, Zhaohui Feng, and Anh Khoa Dinh Phan, having application Ser. No. 11/007,753, and "GENERATING ASYNCHRONOUS INTERFACES AND METHODS FROM SYNCHRONOUS INTERFACES AND METHODS" to Michael Beisiegel, Jean Sebastien Michel Delfino, Martin P. Nally, Peter P. Niblett, and David J. Vineshaving, having application Ser. No. 11/015,306.

BACKGROUND

1. Field

The disclosure relates to a method, system, and article of manufacture for providing service components.

2. Background

Middleware technologies may provide services, such as, Web services, where the Web services may describe a service-oriented, component-based application architecture. Web services may represent a model in which discrete tasks within e-business processes are distributed via the use of software components. Certain Web services may include loosely coupled, reusable software components that semantically encapsulate discrete functionality and are distributed and programmatically accessible over standard Internet protocols. Component-based models allow developers to reuse the building blocks of code created by others to assemble and extend them in new ways.

For example, middleware technologies may provide support for the Java* 2 Platform, Enterprise Edition (J2EE*). The J2EE application model defines a standard for developing component-based multi-tier enterprise applications. Features of J2EE include Web services support and development tools. The J2EE application model divides enterprise applications into three fundamental parts: components, containers, and connectors. Components may be the focus of application developers, while system vendors may implement containers and connectors to conceal complexity and promote portability. The Enterprise JavaBeans (EJB*) component model of J2EE may provide one approach to multi-tier application development.

* J2EE, Java, and EJB are trademarks or registered trademarks of Sun Microsystems.

Modern software applications are increasingly complex. Some of this complexity is inherent complexity that occurs when applications are extended to provide new interfaces or to run in new contexts, such as providing Internet web access to customers, or electronic business-to-business interfaces to other organizations. However much of this complexity may be "incidental" complexity created by the middleware technologies that provide support for modern software applications.

SUMMARY OF THE DESCRIBED EMBODIMENTS

Provided are a method, system, and article of manufacture, wherein a client component including at least one client interface is provided. Also provided is a target component including at least one service interface, wherein the at least one client interface is capable of matching the at least one service interface. A service interface implementation corresponding to the at least one service interface is provided, wherein the service interface implementation is a dynamic service interface implementation. The dynamic service interface implementation is executed to allow access to the client component to a service provided by the target component.

In additional embodiments, the client component further comprises a reference that is typed by the at least one client interface that matches the service interface of the target component, wherein an implementation of the target component is not exposed to the client component, wherein the service component implements defined interfaces, and wherein the client component accesses the target component.

In certain embodiments, the dynamic service interface implementation is of an asynchronous variant.

In additional embodiments, the dynamic service interface implementation is of a synchronous variant.

In further embodiments, the service interface implementation is a static service interface implementation of an asynchronous variant.

In yet further embodiments, the service interface implementation is a static service interface implementation of a synchronous variant.

In additional embodiments, the service interface implementation is the dynamic service implementation if the at least one service interface and the service interface implementation are coded in different computer languages, wherein the client interface is coded in a first computer language and the at least one service interface in the target component is coded in a second computer language.

In still additional embodiments, the service interface implementation is a first service interface implementation, wherein the at least one service interface is a first service interface. A second service implementation corresponding to a second service interface is provided, wherein the second service implementation is a static service interface implementation if the second service interface and the second service interface implementation are coded in a same computer language. The static service interface implementation is executed to allow access to the client component to a service provided by the target component.

In further embodiments, the dynamic service implementation interface has a single invoke method with parameters that correspond to functions whose signatures are included in the corresponding service interface, and wherein the at least one service interface has a signature identifying parameters of the service interface. An implementation of the signature is provided in the at least one service interface.

BRIEF DESCRIPTION OF THE DRAWINGS

Referring now to the drawings in which like reference numbers represent corresponding parts throughout:

FIG. 6 illustrates code for a synchronous interface, in accordance with certain embodiments;

FIG. 7 illustrates code for an asynchronous interface, in accordance with certain embodiments;

FIG. 8 illustrates code for a dynamic implementation interface, in accordance with certain embodiments;

DETAILED DESCRIPTION

In the following description, reference is made to the accompanying drawings which form a part hereof and which illustrate several embodiments. It is understood that other embodiments may be utilized and structural and operational changes may be made.

Figure 1:
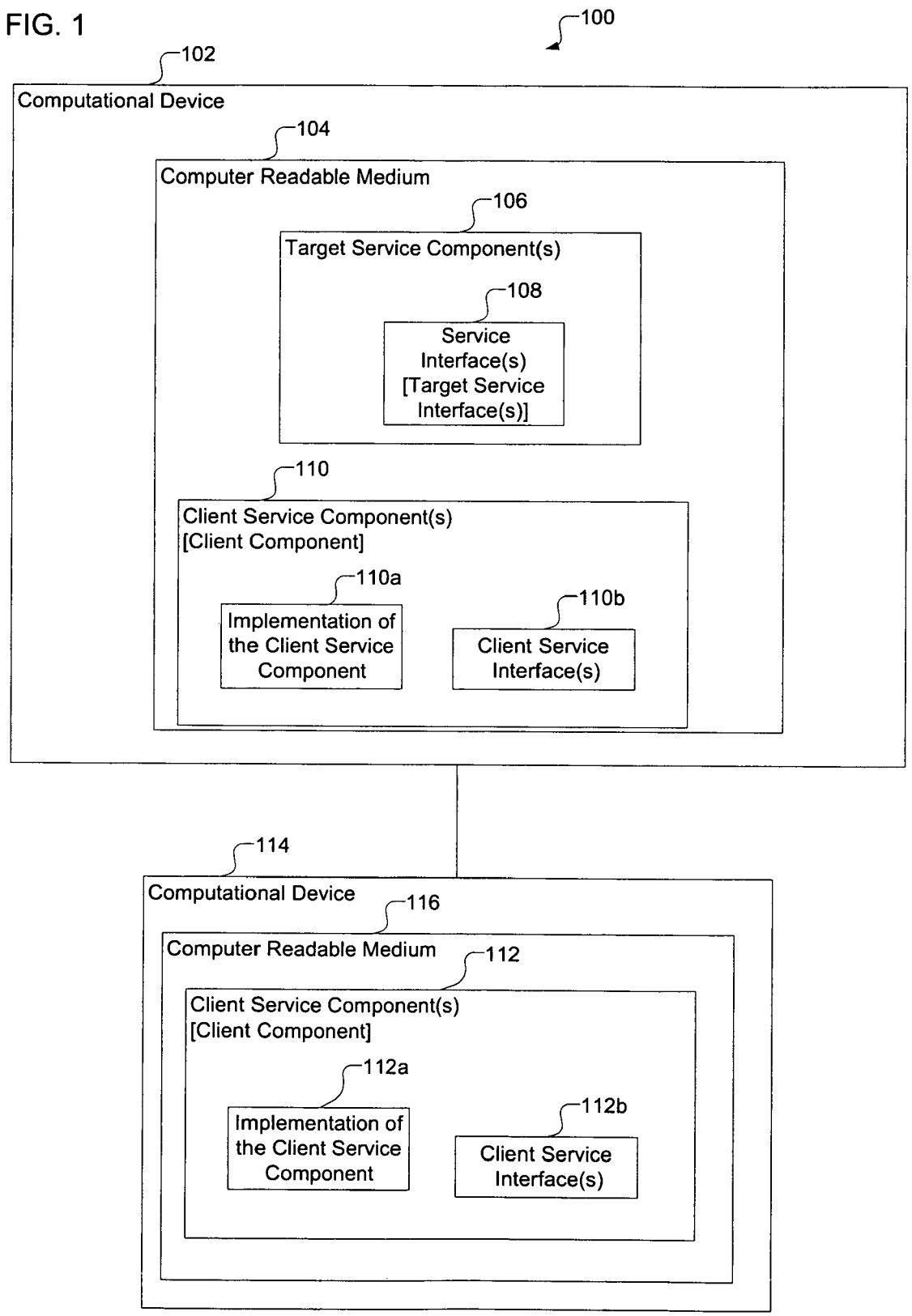
FIG. 1 illustrates a block diagram of a computing environment in accordance with certain embodiments.

FIG. 1 illustrates a block diagram of a computing environment 100 in accordance with certain embodiments. A computational device 102 includes a computer readable medium 104 that includes one or more target service components 106. The target service components 106 may include one or more service interfaces 108 that provide interfaces to the target service components 106. The service interfaces 108 may also be referred to as target service interfaces, i.e., target service interfaces are service interfaces on a target component. Additionally, a target service component may also be referred to as a target component. The computational device 102 may include any suitable computational device presently known in the art, such as, a personal computer, a server, a mainframe, a midrange computer, a blade computer, a telephony device, etc. The computer readable medium 104 may comprise a volatile or non-volatile storage or memory and may also comprise a local storage device, an external storage or an internal memory of the computational device 102.

Client service components 110, 112 may communicate with the target service components 106. In certain embodiments, only one of the two client service components 110, 112 may be present. Both client service components 110, 112 can communicate with the target service component 106. It is possible for client service components to be located internal to the computational device 102 or external to the computational device 102 in some other computational device, such as, computational device 114. For example, in certain embodiments the client service components 110 are included in the computer readable medium 104 of the computational device 102, and the client service components 112 are included in the computer readable medium 116 of the computational device 114. The computational devices 102, 114 may communicate directly or via any suitable network, including those presently known in the art, such as, a storage area network (SAN), a local area network (LAN), an Intranet, the Internet, etc. A client service component may be referred to as a client component. In certain embodiments, a component has interfaces and references, where the references are also typed by interfaces. The interface on the reference of a client component has to match the interface of the target component that the reference is wired to. In certain embodiments, a "Service Wire" is a specification that links a reference with a service that will resolve the reference at runtime.

Client service components include the implementation of the client service component and client service interfaces. The client service interfaces are the interfaces of the references of the client components. For example, the client service components 110 may include the implementation of the client service components 110a and client service interfaces 110b, whereas the client service components 112 may include the implementations of the client service components 112a and client service interfaces 112b.

Therefore, FIG. 1 illustrates an embodiment in which implementations of client service components 110a, 112a use client service interfaces 110b, 112b to interface with target service interfaces 108 for accessing services, such as Web services or other services, provided by the target service components 106.

Figure 2:
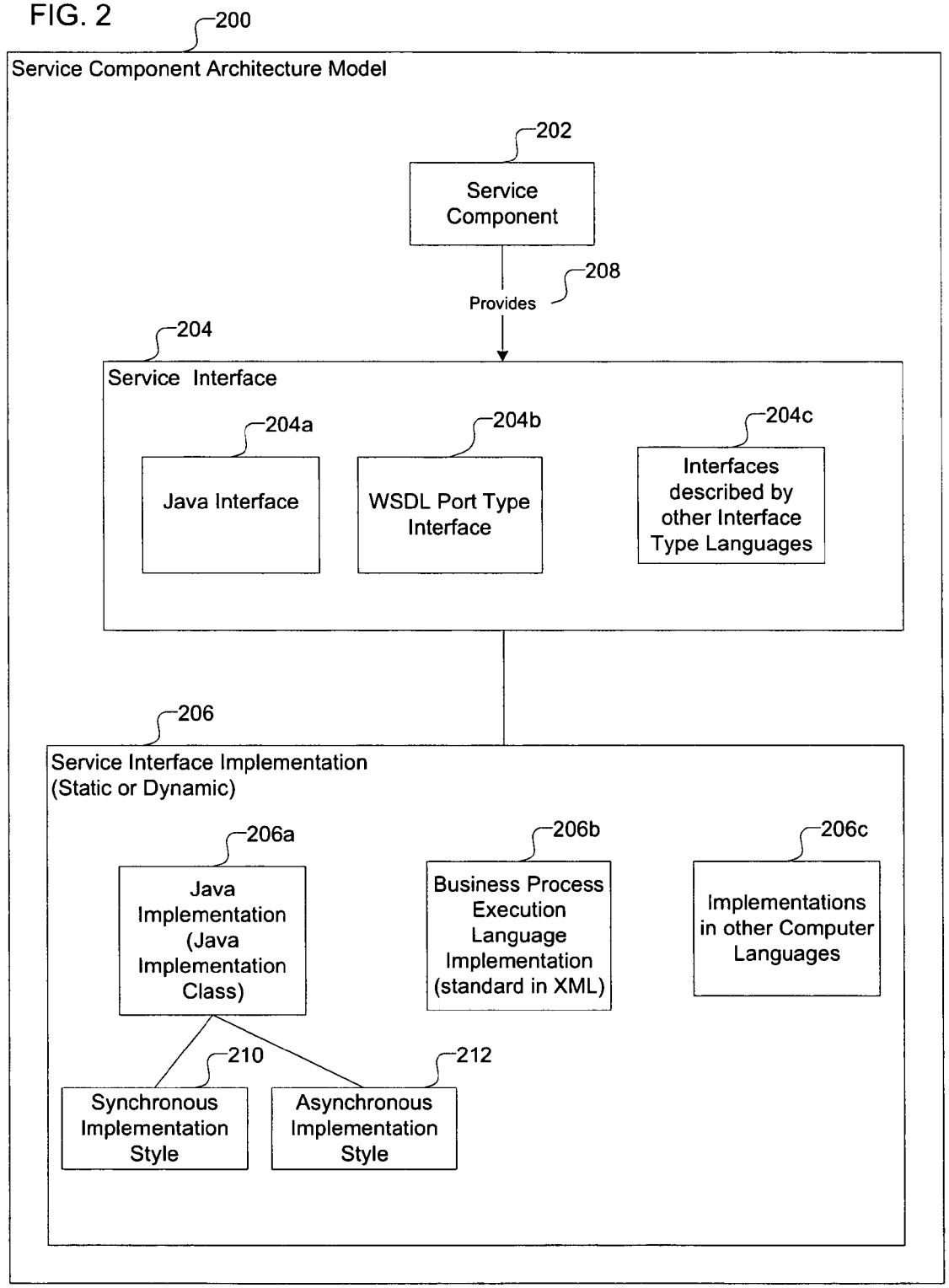
FIG. 2 illustrates a block diagram that shows a service component architecture model, in accordance with certain embodiments.

FIG. 2 illustrates a block diagram that shows a service component architecture model 200 implemented in the computing environment 100, in accordance with certain embodiments.

The service component architecture model 200 comprises an exemplary service component 202, an exemplary service interface 204, and an exemplary service interface implementation 206. The service component 202 may use references (not shown) to access other service components (not shown).

In certain embodiments, the exemplary service component 202 may be an example of the target service component 106 and the exemplary service interface 204 may be an example of the target service interface 108. The service component 202 provides (reference numeral 208) the service interface 204 for use by client service components 110, 112. The service component architecture model 200 shown in FIG. 2 is applicable to both the client service components 110, 112 and the target service component 106.

In certain embodiments, the exemplary service interface 204 may be provided in one or more computer languages. For example, the exemplary service interface 204 may provide a Java Interface 204a, a Web Services Definition Language (WSDL) Port Type Interface 204b, and interfaces 204c described by other interface type languages. The Java interface 204 may define methods comprising signatures of a class in the Java programming language. The WSDL port type interface 204b may include definitions of operations in the WSDL computer language.

The exemplary service interface implementation 206 is an exemplary implementation of the service interface 204. The service interface implementation 206 may be in provided in one or more computer languages. For example, a Java class may provide a Java implementation 206a for the service interface implementation 206. In another example, a business process execution language implementation 206b may be provided. Implementations in other computer languages (reference numeral 206c) are also possible in certain embodiments.

In certain embodiments, the service interface implementation 206 may be in the same or in a different computer language than the computer language of the service interface 204. For example, the service interface 204 may be the WSDL port type interface 204b, where the WSDL port type interface 204 is implemented by the Java implementation 206a. In another example, the service interface 204 may be the Java interface 204a that is implemented by the Java implementation 206a. In such a case, in certain embodiments, the implementations of the methods whose signatures are provided in the Java interface 204a are provided in the Java implementation 206a. The Java implementation 206a may be a Java class that is implemented in a synchronous implementation style 210 or an asynchronous implementation style 212. The service interface implementation 206 may be a static implementation interface or a dynamic implementation interface.

In certain exemplary embodiments, a class either implements the Java interface specified in a Service component definition, or may implement the methods of that interface, or may implement an exemplary <interface-name>ImplAsync (i.e., asynchronous) variant of that interface, or may implement an exemplary ServiceImplSync (i.e., synchronous) interface, or may implement an exemplary ServiceImplAsync (i.e., asynchronous) interface. If a WSDL portType was used for the interface in the Service component definition, then the class either implements the Java interface derived from the portType, or implements the Java methods derived from the portType, or implements the ServiceImplSync interface, or implements the ServiceImplAsync interface. Certain embodiments can implement static (i.e. implement Java interface or just the methods of the interface), or dynamic (i.e. implement the dynamic interface). This can be done when the service interface is defined as a Java interface, or as a WSDL porttype. Not only synchronous but asynchronous variants exist in certain embodiments. Further details on synchronous and asynchronous variants may be found in the co-pending and commonly assigned patent application entitled "GENERATING ASYNCHRONOUS INTERFACES AND METHODS FROM SYNCHRONOUS INTERFACES AND METHODS" to Michael Beisiegel, Jean Sebastien Michel Delfino, Martin P. Nally, Peter P. Niblett, and David J. Vineshaving, having application Ser. No. 11/015,306.

In certain embodiments the Java implementation 206a is via a Java implementation class. The Java implementation class may implement the methods of the Java interface 204a or a synchronous or asynchronous variant of the Java interface 204a. For all methods of the interface either the synchronous or asynchronous variant is implemented. If a WSDL portType interface 204a was used for the interface in the service interface 204, then the Java implementation class 206a either implements the Java interface derived from the portType, or the Java methods derived from the portType, or a synchronous or asynchronous variant. For example, in certain embodiments if the Java interface is implemented or just the methods are implemented, then either the synchronous or asynchronous variant is implemented.

Figure 3:
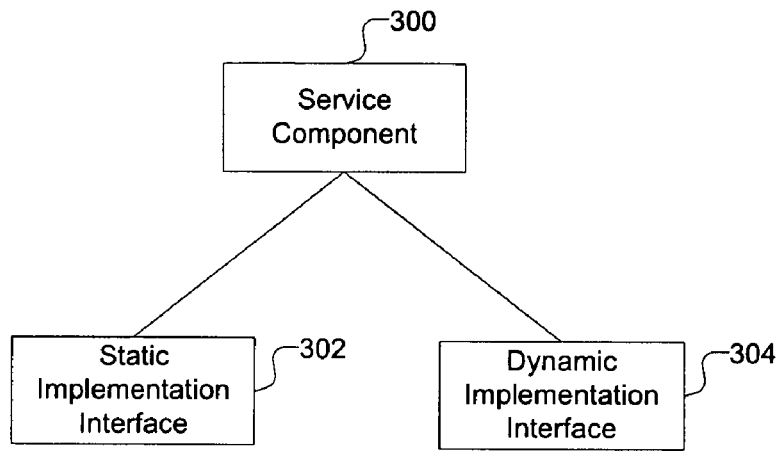
FIG. 3 illustrates a block diagram that shows static and dynamic implementation interfaces for service components, in accordance with certain embodiments.

FIG. 3 illustrates a block diagram that shows static and dynamic implementation interfaces for service components implemented in the computing environment 100, in accordance with certain embodiments. An exemplary service component 300 may provide a service interface and a corresponding service implementation may either implement that interface via a static implementation interface 302 or a dynamic implementation interface 304. The dynamic implementation interface 304 implements methods dynamically, i.e., for a given method name the dynamic implementation interface 304 executes respective code segments corresponding to the method name in the body of the dynamic implementation interface 304. The dynamic implementation interface 304 may provide an invoke method for calling methods dynamically. This invoke method takes as arguments, the method name, and an input Object array. The static implementation interface 302 calls methods statically in the Java programming language.

Figure 4:
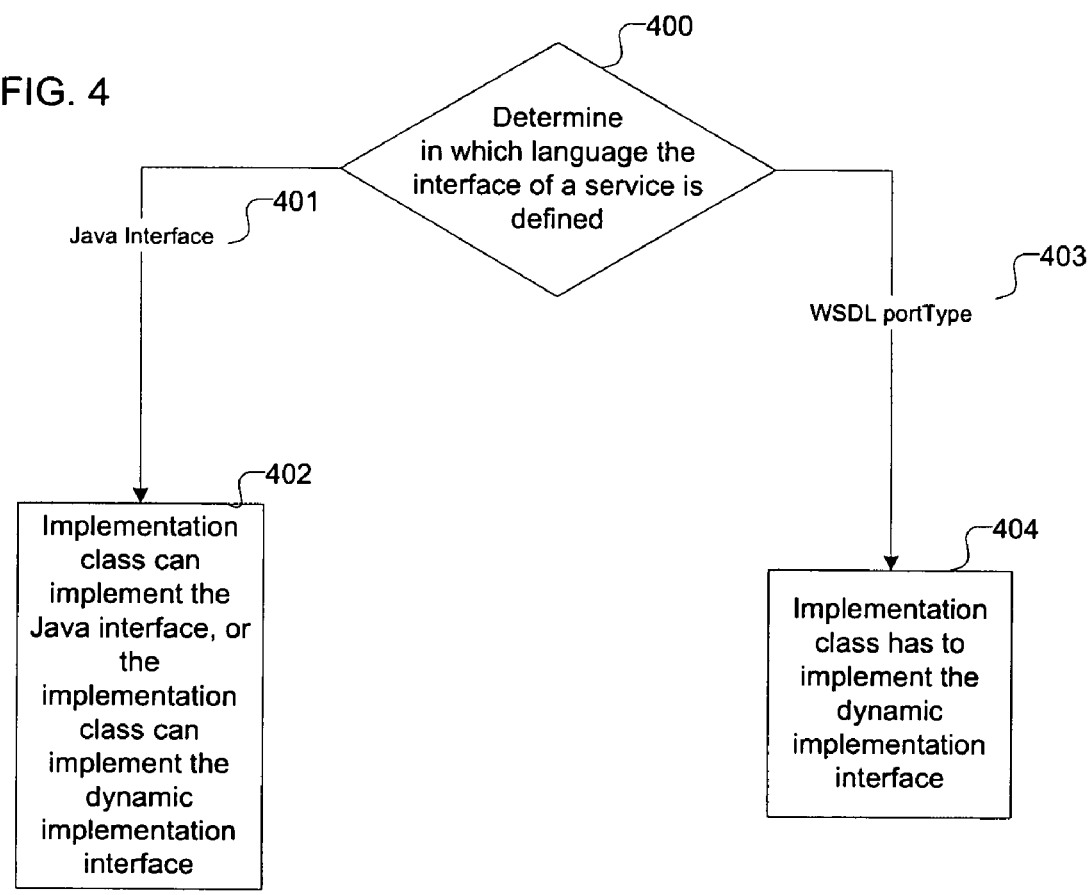
FIG. 4 illustrates operations to determine whether to use static or dynamic implementation interfaces, in accordance with certain embodiments.

FIG. 4 illustrates operations to determine whether to use static 302 or dynamic 304 implementation interfaces in the computing environment 100, in accordance with certain embodiments. In FIG. 4 the service interface implementation is via the Java implementation class 206a.

Instead of implementing a specific business interface certain embodiments can implement the dynamic implementation interfaces ServiceImplSync (synchronous interface) or ServiceImplAsync (Asynchronous interface). If the interface of a Service is defined by a Java interface, then the implementation class can implement that Java interface, or the implementation class can implement the dynamic implementation interface. If the interface of the Service is defined by a WSDL portType, then the implementation class has to implement the dynamic implementation interface.

For example, control starts at block 400 where a determination is made as to the language in which the interface of a service is define. If the interface is a Java interface 401 then the implementation class can implement (at block 402) that Java interface, or the implementation class can implement the dynamic implementation interface. If the interface is defined by a WSDL portType 403 then the implementation class has to implement (at block 404) the dynamic implementation interface. The dynamic implementation interface has to be implemented if the interface is not a Java interface.

Figure 5:
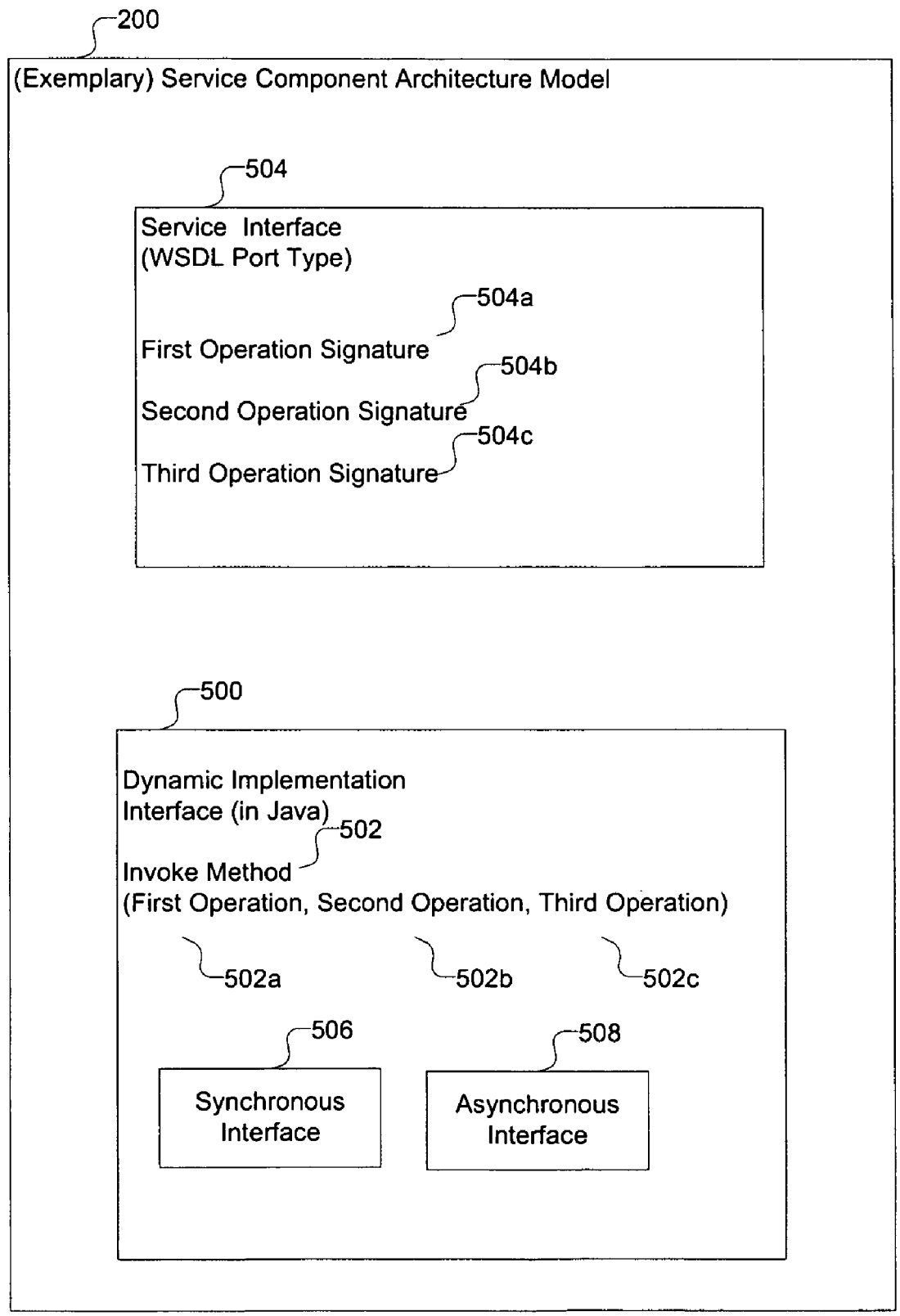
FIG. 5 illustrates a block diagram that shows how an exemplary dynamic implementation interface is implemented, in accordance with certain embodiments.

FIG. 5 illustrates a block diagram that shows how an exemplary dynamic implementation interface 500 of the service component architecture model 200 is implemented in the computing environment 100, in accordance with certain embodiments.

The dynamic implementation interface 500 implemented as a Java class provides an invoke method 502 for calling methods dynamically. This invoke method 502 takes as arguments, the method name, and an input Object array. The invoke method 502 is implemented in a dynamic way, i.e., just one method (invoke) is implemented and the method name is passed as argument, so that depending on the method name passed different operations may be performed inside the invoke method. The invoke method return an Object array as well. For example, if a service interface 504 is defined in the WSDL port type with signatures for first, second, and third operations 504a, 504b, 504c then the invoke method 502 includes first, second, and third operations 502a, 502b, 502c in the arguments. A Java interface can also be implemented dynamically. The implementation aspect of the target component is hidden to this client.

FIG. 6 illustrates exemplary code 600 in the Java programming language for a synchronous dynamic implementation interface 506 implemented in the computing environment 100, in accordance with certain embodiments. In FIG. 6, the synchronous dynamic implementation interface 506 is an exemplary public interface named "ServiceImplSync" 602.

In the "synchronous" style, the developer implements the interface defined in a collection of request/response method implementations. The synchronous dynamic implementation interface 506 uses the return value of each method (if any) to return the response.

FIG. 7 illustrates exemplary code 700 in the Java programming language for an asynchronous dynamic implementation interface 508 implemented in the computing environment 100, in accordance with certain embodiments. In FIG. 7, the asynchronous dynamic implementation interface 508 is an exemplary public interface named "ServiceImplAsynch" 702.

In the asynchronous dynamic implementation interface 508 the server-side service invocation signature includes a callback which the service implementation can use to send the reply. The signature omits this callback in the case where the method has no return value and no exceptions.

This choice of a synchronous or asynchronous interface implementations can be made differently for each interface that is supported by a given service component and applies to all the methods within the interface. A developer may avoid the synchronous style if there is a possibility that an operation will take a significant time to complete. The invocation threads are released in a timely fashion in the asynchronous style.

FIG. 8 illustrates exemplary code 800 in the Java programming language for a dynamic implementation interface 500 implemented in the computing environment 100, in accordance with certain embodiments. In FIG. 8 the exemplary code 800 shows a sample of a service implementation implementing the "ServiceImplSync" 802 interface. An exemplary invoke method 804 is also shown, where the invoke method 804 can take a plurality of arguments 806. The exemplary code 800 relates to exemplary exchange rate services.

Figure 9:
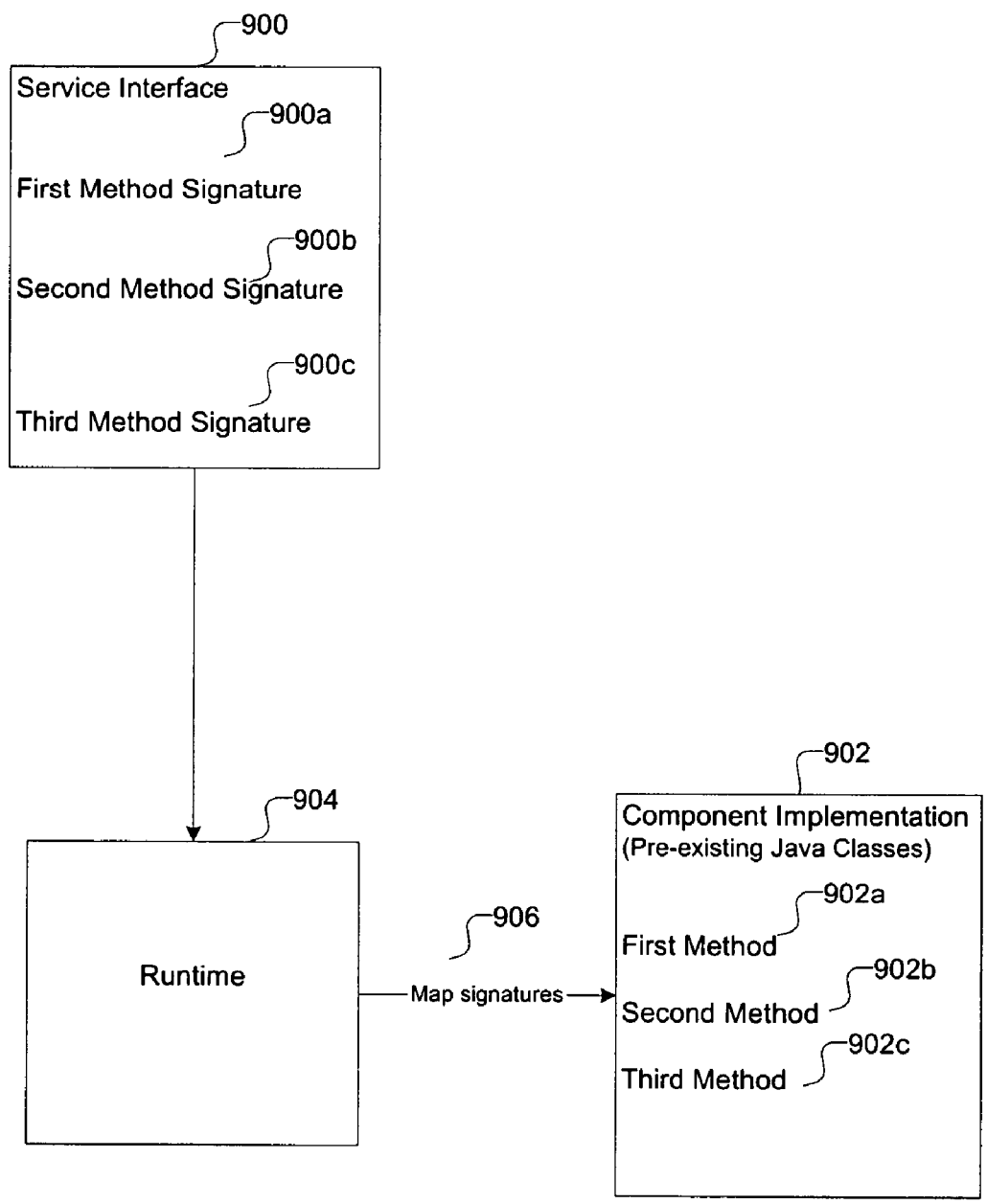
FIG. 9 illustrates a block diagram that shows how to map signatures to pre-existing classes, in accordance with certain embodiments.

FIG. 9 illustrates a block diagram that shows how to map signatures to pre-existing classes in the computing environment 100, in accordance with certain embodiments. Certain embodiments implement the methods of the interface but not the method itself.

In certain exemplary embodiments, the service interface 900 may include first, second, and third method signatures 900a, 900b, 900c. In certain embodiments, a component implementation 902 comprising pre-existing Java classes may already provide first, second, and third methods 902a, 902b, 902c corresponding to the method signatures 900a, 900b, 900c. For example, the component implementation 902 comprising the pre-existing Java classes may be provided by previously written code provided by external vendors or libraries.

Certain embodiments provide a runtime 904 that performs the invocation for the case that the component implements the methods of the interface but not the interface itself. For example, the runtime via the invocation can map 906 the signatures 900a, 900b, 900c to the methods 902a, 902b, 902c of the component implementation 902 comprising the pre-existing Java classes. As a result, the methods 902a, 902b, 902c may not have to be written once again. In certain embodiments, the implementation 904 may be part of a runtime that is able to determine the operations to perform when the pre-existing Java classes 902 do not implement the service interface but the methods 902a, 902b, 902c.

Figure 10:
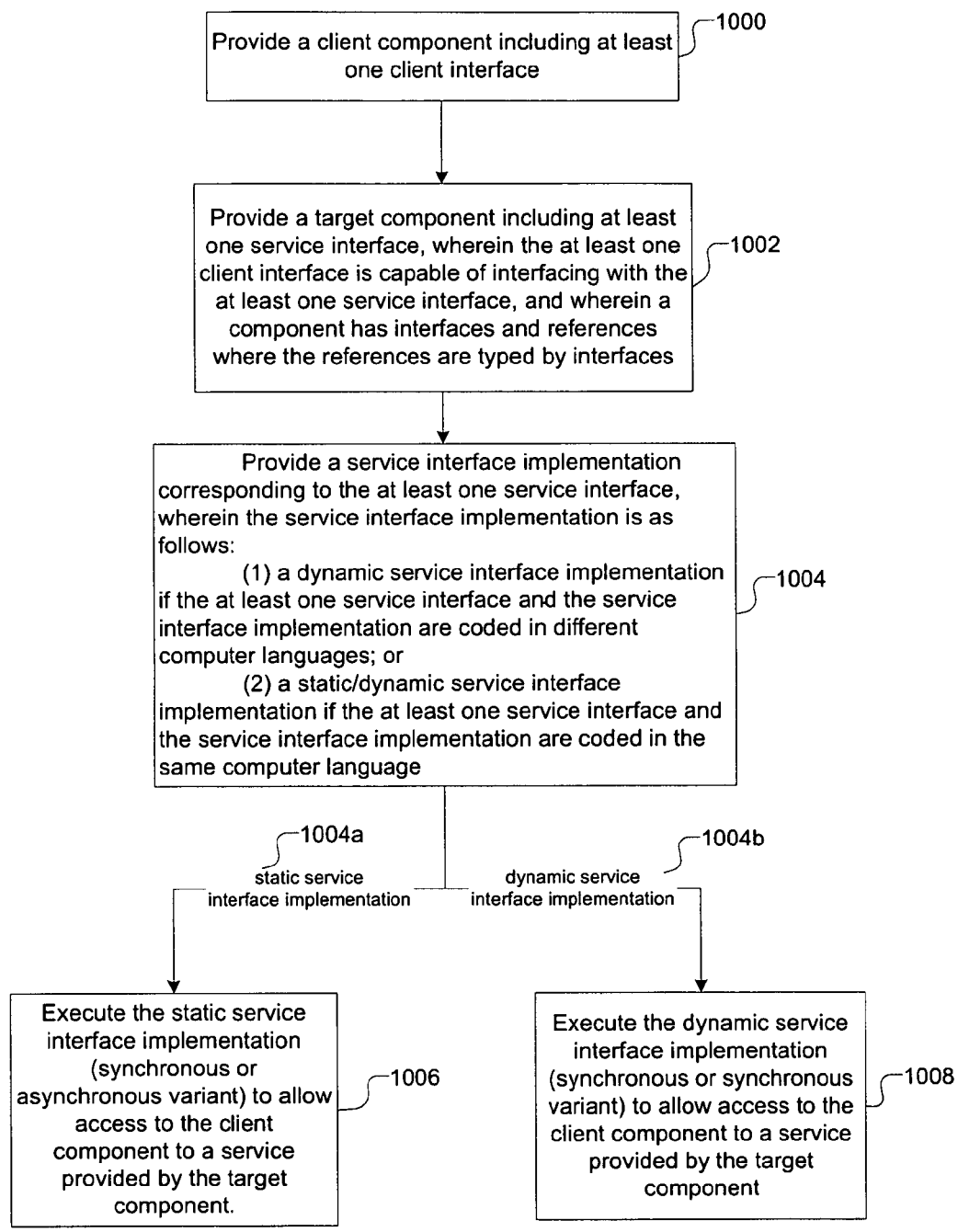
FIG. 10 illustrates operations for providing service components, in accordance with certain embodiments.

FIG. 10 illustrates operations for providing service components implemented in the computing environment 100, in accordance with certain embodiments.

Control starts at block 1000, where a client service component 110, 112 including at least one client service interface 110b, 112b is provided. Control proceeds to block 1002, where a target service component 106 including at least one target service interface 108 is provided, wherein the at least one client interface 110b, 112b is capable of interfacing with the at least one target service interface 108, and wherein a component has interfaces and references where the references are also typed by interfaces.

At block 1004, a service interface implementation 206 corresponding to the at least one service interface is provided, wherein the service interface implementation 206 is a either (1) a dynamic service interface implementation if the at least one service interface and the service interface implementation are coded in different computer languages; or (2) a static/dynamic service interface implementation if the at least one service interface and the service interface implementation are coded in the same computer language.

Control proceeds from block 1004 to block 1006 in case of a static service interface implementation 1004a. An block 1006, the static service interface implementation (synchronous or asynchronous variant) is executed to allow access to the client service component 110, 112 to a service provided by the target service component 106.

Control proceeds from block 1004 to block 1008 in case of a dynamic service interface implementation 1004b. At block 1008, the dynamic service interface implementation 304 (synchronous or asynchronous variant) is executed to allow access to the client service component 110, 112 to a service provided by the target service component 106.

Therefore FIG. 10, illustrates certain embodiments in which static and dynamic service interface implementations are provided in both synchronous and asynchronous variants.

In certain embodiments, service components can be implemented in different languages. One of the most relevant languages to support is the Java language. For implementing a service component in Java a simple Java class may be implemented. The Java class implements the interface defined for the service component. Certain embodiments provide a choice between a static and dynamic implementation style of the service component interface. The dynamic implementation style may be used when the actual service component interface is not expressed in Java. A service component implemented in Java is able to use other services in the implementation without referring to the other services explicitly. The Java implementation is also able to use service references to refer to the services used by the Java implementation.

Certain embodiments, provide a Java implementation model for service components based on a simple Java class. If the service components interfaces are defined in Java, then the Java class either implements those interfaces or the Java class implements the dynamic service implementation interface. If the service components interfaces are defined in another interface type language (e.g., WSDL portTypes), then the Java class implements the dynamic service implementation interface. The Java class can also be implemented using the asynchronous implementation style. The Java service implementation can make use of other services using service references. The usage of these other services is not hard wired into the Java class. The service implementation can be configured through properties whose values are provided by the service component. The service component definitions can be provided in-line in the Java class in form of Javadoc formatted annotations. These annotations cover interface, reference and qualifier definitions.

Additional Embodiment Details

The described techniques may be implemented as a method, apparatus, or article of manufacture involving software, firmware, micro-code, hardware and/or any combination thereof. The term "article of manufacture" as used herein refers to program instructions, code and/or logic implemented in circuitry (e.g., an integrated circuit chip, Programmable Gate Array (PGA), ASIC, etc.) and/or a computer readable medium (e.g., magnetic storage medium, such as hard disk drive, floppy disk, tape), optical storage (e.g., CD-ROM, DVD-ROM, optical disk, etc.), volatile and non-volatile memory device (e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.). Code in the computer readable medium may be accessed and executed by a machine, such as, a processor. In certain embodiments, the code in which embodiments are made may further be accessible through a transmission medium or from a file server via a network. In such cases, the article of manufacture in which the code is implemented may comprise a transmission medium, such as a network transmission line, wireless transmission media, signals propagating through space, radio waves, infrared signals, etc. Of course, those skilled in the art will recognize that many modifications may be made without departing from the scope of the embodiments, and that the article of manufacture may comprise any information bearing medium known in the art. For example, the article of manufacture comprises a storage medium having stored therein instructions that when executed by a machine results in operations being performed.

Figure 11:
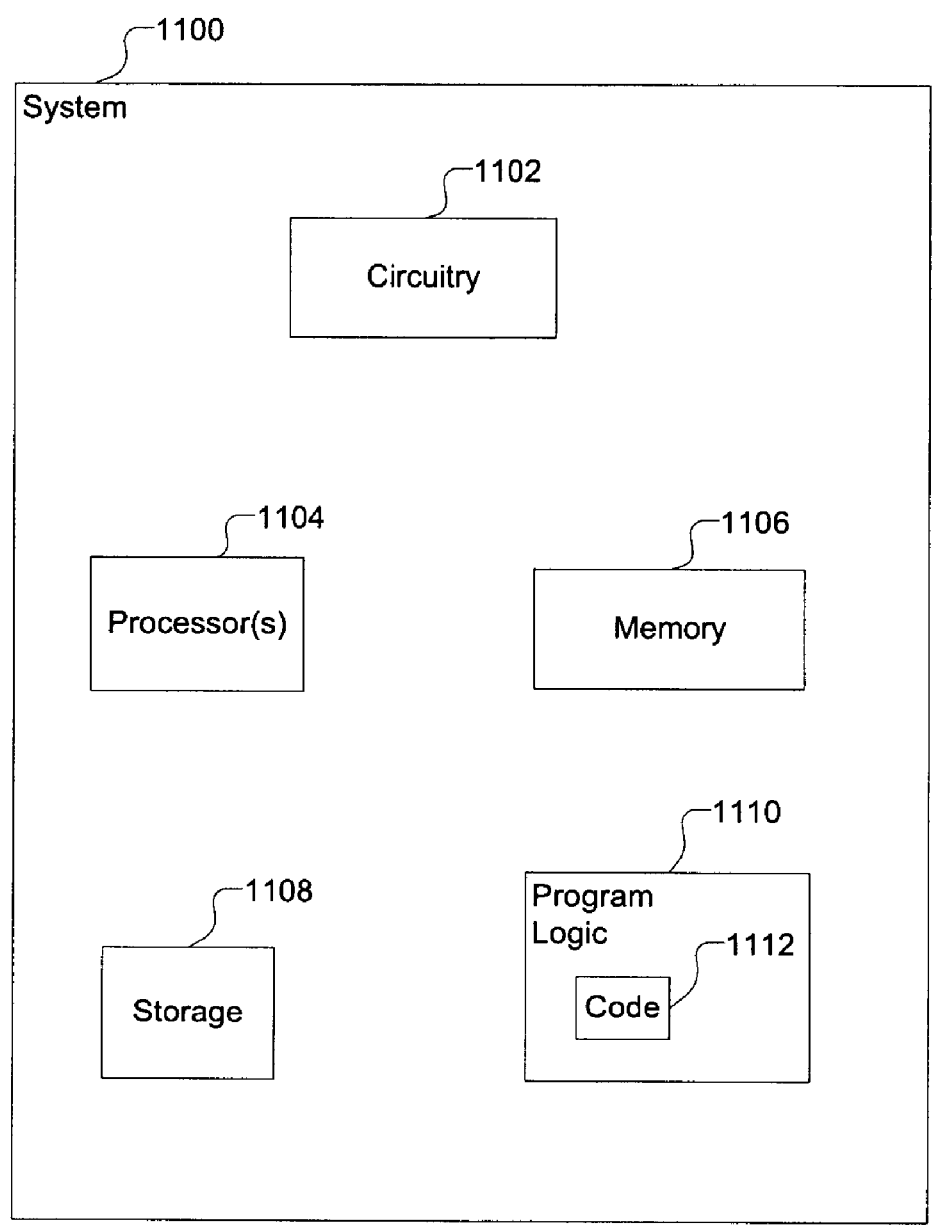
FIG. 11 illustrates a system in which certain embodiments are implemented.

FIG. 11 illustrates a block diagram of a system 1100 in which certain embodiments may be implemented. In certain embodiments, the computational devices 102, 114 may be implemented in accordance with the system 1100. The system 1100 may include a circuitry 1102 that may in certain embodiments include a processor 1104. The system 1100 may also include a memory 1106 (e.g., a volatile memory device), and storage 1108. Certain elements of the system 1100 may or may not be found in the computational devices 102, 114. The storage 1108 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 1108 may comprise an internal storage device, an attached storage device and/or a network accessible storage device. The system 1100 may include a program logic 1110 including code 1112 that may be loaded into the memory 1106 and executed by the processor 1104 or circuitry 1102. In certain embodiments, the program logic 1110 including code 1112 may be stored in the storage 1108. In certain other embodiments, the program logic 1110 may be implemented in the circuitry 1102. Therefore, while FIG. 111 shows the program logic 1110 separately from the other elements, the program logic 1110 may be implemented in the memory 1106 and/or the circuitry 1102.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in the figures may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-11 are described as having specific types of information. In alternative embodiments, the data structures and components may be structured differently and have fewer, more or different fields or different functions than those shown or referred to in the figures.

Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method comprising:
   providing a client component including at least one client interface;
   providing a target component including at least one service interface, wherein the at least one client interface is capable of matching the at least one service interface using a reference that is typed by the at least one client interface that matches the at least one service interface;
   providing a service interface implementation corresponding to the at least one service interface, wherein the service interface implementation is a dynamic service interface implementation, wherein the dynamic service interface implementation has a single invoke method with parameters that correspond to functions whose signatures are included in the corresponding service interface;
   executing the dynamic service interface implementation to allow access to the client component to a service provided by the target component, wherein the service interface implementation is the dynamic service interface implementation if the at least one service interface and the service interface implementation are coded in different computer languages, wherein the service interface implementation is a first service interface implementation, and wherein the at least one service interface is a first service interface, the method further comprising:
      providing a second service interface implementation corresponding to a second service interface, wherein the second service interface implementation is a static service interface implementation if the second service interface and the second service interface implementation are coded in a same computer language.

2. The method of claim 1, wherein the client component further comprises the reference that is typed by the at least one client interface that matches the at least one service interface of the target component, wherein an implementation of the target component is not exposed to the client component, wherein the target component implements defined interfaces, and wherein the client component accesses the target component.

3. The method of claim 1, wherein the dynamic service interface implementation is of an asynchronous variant.

4. The method of claim 1, wherein the dynamic service interface implementation is of a synchronous variant.

5. The method of claim 1, wherein the service interface implementation is a static service interface implementation of an asynchronous variant.

6. The method of claim 1, wherein the service interface implementation is a static service interface implementation of a synchronous variant.

7. The method of claim 1, wherein the client interface is coded in a first computer language and the at least one service interface in the target component is coded in a second computer language.

8. The method of claim 1, the method further comprising:
   executing the static service interface implementation to allow access to the client component to a service provided by the target component.

9. The method of claim 1, wherein the at least one service interface has a signature identifying parameters of the service interface, the method further comprising:
   providing an implementation of the signature in the at least one service interface.

10. The method of claim 1, wherein a component implementation comprising pre-existing classes provide first and second methods corresponding to first and second method signatures, the method further comprising:

mapping the first and the second signatures to the first and the second methods at runtime and retaining the first and the second methods provided by the pre-existing classes.

11. A system, comprising:
   memory; and
   a processor coupled to the memory, wherein the processor is capable of performing operations, the operations comprising:
   (i) providing a client component including at least one client interface;
   (ii) providing a target component including at least one service interface, wherein the at least one client interface is capable of matching the at least one service interface using a reference that is typed by the at least one client interface that matches the at least one service interface;
   (iii) providing a service interface implementation corresponding to the at least one service interface, wherein the service interface implementation is a dynamic service interface implementation, wherein the dynamic service interface implementation has a single invoke method with parameters that correspond to functions whose signatures are included in the corresponding service interface; and
   (iv) executing the dynamic service interface implementation to allow access to the client component to a service provided by the target component, wherein the service interface implementation is the dynamic service interface implementation if the at least one service interface and the service interface implementation are coded in different computer languages, wherein the service interface implementation is a first service interface implementation, and wherein the at least one service interface is a first service interface, the operations further comprising:
      providing a second service interface implementation corresponding to a second service interface, wherein the second service interface implementation is a static service interface implementation if the second service interface and the second service interface implementation are coded in a same computer language.

12. The system of claim 11, wherein the client component further comprises the reference that is typed by the at least one client interface that matches the at least one service interface of the target component, wherein an implementation of the target component is not exposed to the client component, wherein the target component implements defined interfaces, and wherein the client component accesses the target component.

13. The system of claim 11, wherein the dynamic service interface implementation is of an asynchronous variant.

14. The system of claim 11, wherein the dynamic service interface implementation is of a synchronous variant.

15. The system of claim 11, wherein the service interface implementation is a static service interface implementation of an asynchronous variant.

16. The system of claim 11, wherein the service interface implementation is a static service interface implementation of a synchronous variant.

17. The system of claim 11, wherein the client interface is coded in a first computer language and the at least one service interface in the target component is coded in a second computer language.

18. The system of claim 11, wherein the operations further comprise:
   executing the static service interface implementation to allow access to the client component to a service provided by the target component.

19. The system of claim 11, wherein the at least one service interface has a signature identifying parameters of the service interface, and wherein the operations further comprise:
   providing an implementation of the signature in the at least one service interface.

20. The system of claim 11, wherein a component implementation comprising pre-existing classes provide first and second methods corresponding to first and second method signatures, and wherein the operations further comprise:
   mapping the first and the second signatures to the first and the second methods at runtime and retaining the first and the second methods provided by the pre-existing classes.

21. A computer readable storage medium, wherein code stored in the computer readable storage medium when executed by a processor causes operations, the operations comprising:
   providing a client component including at least one client interface;
   providing a target component including at least one service interface, wherein the at least one client interface is capable of matching the at least one service interface using a reference that is typed by the at least one client interface that matches the at least one service interface;
   providing a service interface implementation corresponding to the at least one service interface, wherein the service interface implementation is a dynamic service interface implementation, wherein the dynamic service interface implementation has a single invoke method with parameters that correspond to functions whose signatures are included in the corresponding service interface; and
   executing the dynamic service interface implementation to allow access to the client component to a service provided by the target component, wherein the service interface implementation is the dynamic service interface implementation if the at least one service interface and the service interface implementation are coded in different computer languages, wherein the service interface implementation is a first service interface implementation, and wherein the at least one service interface is a first service interface, the operations further comprising:
      providing a second service interface implementation corresponding to a second service interface, wherein the second service interface implementation is a static service interface implementation if the second service interface and the second service interface implementation are coded in a same computer language.

22. The computer readable storage medium of claim 21, wherein the client component further comprises the reference that is typed by the at least one client interface that matches the at least one service interface of the target component, wherein an implementation of the target component is not exposed to the client component, wherein the target component implements defined interfaces, and wherein the client component accesses the target component.

23. The computer readable storage medium of claim 21, wherein the dynamic service interface implementation is of an asynchronous variant.

24. The computer readable storage medium of claim 21, wherein the dynamic service interface implementation is of a synchronous variant.

25. The computer readable storage medium of claim 21, wherein the service interface implementation is a static service interface implementation of an asynchronous variant.

26. The computer readable storage medium of claim 21, wherein the service interface implementation is a static service interface implementation of a synchronous variant.

27. The computer readable storage medium of claim 21, wherein the client interface is coded in a first computer language and the at least one service interface in the target component is coded in a second computer language.

28. The computer readable storage medium of claim 21, wherein the operations further comprise:
   executing the static service interface implementation to allow access to the client component to a service provided by the target component.

29. The computer readable storage medium of claim 21, wherein the at least one service interface has a signature identifying parameters of the service interface, and wherein the operations further comprise:
   providing an implementation of the signature in the at least one service interface.

30. The computer readable storage medium of claim 21 wherein a component implementation comprising pre-existing classes provide first and second methods corresponding to first and second method signatures, and wherein the operations further comprise:
   mapping the first and the second signatures to the first and the second methods at runtime and retaining the first and the second methods provided by the pre-existing classes.

* * * * *